United States Patent Office 3,484,483
Patented Dec. 16, 1969

3,484,483
PROCESS FOR PRODUCING α-6-
DEOXYTETRACYCLINES
James J. Korst, Old Lyme, Conn., assignor to Chas. Pfizer
& Co., Inc., New York, N.Y., a corporation of Delaware
No Drawing. Filed Oct. 31, 1966, Ser. No. 590,472
Int. Cl. C07c 103/19
U.S. Cl. 260—559                                    7 Claims

ABSTRACT OF THE DISCLOSURE

Preparation of α-6-deoxytetracyclines by treatment of 6-deoxy-13-mercaptotetracyclines with trialkyl phosphite in the presence of 0.1 to 1 part by weight of a free-radical-generating catalyst at elevated temperature.

---

The present invention relates to a new and useful process for producing α-6-deoxytetracyclines.

U.S. Patent 3,200,149 discloses and claims, inter alia, a novel group of tetracycline compounds which are generally designated as α-6-deoxytetracyclines. The designation, "6-epi" and "α" are used interchangeably therein to refer to identical spatial orientation of the 6-methyl substituent. U.S. Patent 3,165,531 uses the designation "6-epi" in the same sense as used in U.S. Patent 3,200,149 and appropriately uses "6-deoxytetracyclines" when referring to the known prior art isomers. The latter compounds have now been more precisely designated in the scientific literature as β-6-deoxytetracyclines and the present disclosure uses the "α" and "β" terminology in the same context.

The process of U.S. Patent 3,200,149 for producing α-6-deoxytetracyclines involves catalytic hydrogenation of a 6-deoxy-6-demethyl-6-methylene tetracycline to produce a mixture containing the corresponding prior art β-6-deoxytetracycline and the corresponding α-6-deoxytetracycline. This reaction mixture is then separated to obtain the desired α-isomer. U.S. Patent 3,165,531 describes and claims, inter alia, an improved process for producing high yields of α-6-deoxytetracyclines by Raney nickel desulfurization of certain novel 13-substituted-6-deoxytetracyclines. Although this process is an exceedingly valuable one, it requires extensive purification procedures in order to obtain separation of traces of the Raney nickel catalyst component from the desired α-6-deoxytetracycline.

In accordance with the present invention, it has been unexpectedly discovered that the aforesaid difficulties of Raney nickel desulfurization can be avoided, without sacrifice of yield, by the use of certain phosphites and phosphines. Although desulfurization of certain simple mercaptans by the use of a trialkyl phosphite has been described in the prior art, e.g., at JACS 78: 6414 (1956), and this procedure has been extended to the use of other phosphites and the corresponding phosphines, the process of the present invention involves certain critical and unexpected departures from the same.

In accordance with the process of the present invention, it has been discovered that α-6-deoxy-13-mercapto-5-oxytetracycline, α-6-deoxy-13-mercapto-tetracycline, and the acid-addition salts thereof may be converted to the corresponding α-6-deoxytetracycline by treatment with at least an equivalent amount of a tri-(lower alkyl)phosphite in the presence of from about 0.1 to about 1.0 part by weight, based on the weight of mercaptan reactant, of a free-radical-generating catalyst at a temperature of from about 50° C. to about 150° C.

Although the reaction may be carried out in the absence of added solvent by the use of excess tri-(lower alkyl) phosphite, it is preferred to employ a solvent. The choice of solvent is not critical. Any reaction-inert organic solvent can be used, that is, a solvent which is free of adverse effect on the reactants and products under the conditions of the process. Excellent results are obtained with solvents such as dioxane, tetrahydrofuran, acetonitrile, formamide, dimethylformamide, dimethylacetamide, and lower alkanols including ethanol, methanol and isopropanol. Other appropriate solvents include the glycol ethers, especially the lower alkyl monoethers of ethylene glycol and diethylene glycol, e.g., ethylene glycol monoethyl ether, diethylene glycol monomethyl ether, and the like. It will ordinarily be desirable to choose a solvent boiling at or above the reaction temperature selected, merely to avoid the inconvenience of operating under elevated pressure in a closed vessel. A preferred solvent medium is dioxane at a temperature of approximately 100–105° C.

The trialkyl phosphites of the present invention include those of the formula $(RO)_3P$ wherein R is any lower alkyl radical, e.g., methyl, ethyl, isopropyl, butyl, etc. Additionally, there is every reason to believe that triaryl phosphites such as triphenyl phosphite should prove to be the full equivalent of the aforesaid tri-(lower alkyl) phosphites. Furthermore, the corresponding trialkyl and triaryl phosphines should also be considered equivalents of the alkyl phosphites of the present invention.

"Free-radical-generating catalyst" as used herein refers to a well-known class of catalysts including the inorganic peroxides such as hydrogen peroxide and the like; the organic peroxy compounds such as dialkyl peroxides, e.g., diethyl peroxide, diisopropyl peroxide, dilauryl peroxide, dioleyl peroxide, distearyl peroxide, di-(tertiary-butyl) peroxide, di-(tertiary amyl) peroxide, dicumyl peroxide and the like; the alkyl hydrogen peroxides such as tertiary butyl hydroperoxide, tertiary amyl hydroperoxide, cumene hydroperoxide, tetralin hydroperoxide, and diisopropyl benzene hydroperoxide and the like; the symmetrical diacyl peroxides, for instance acetyl peroxide, propionyl peroxide, lauroyl peroxide, stearoyl peroxide, malonyl peroxide, succinoyl peroxide, phthaloyl peroxide, benzoyl peroxide, ketone peroxides such as methylethyl ketone peroxide, cyclohexanone peroxide, and the like; the fatty oil acid peroxides, such as cocoanut oil acid peroxides and the like; the unsymmetrical or mixed diacyl peroxides, such as acetyl benzoyl peroxide, propionyl benzoyl peroxide and the like; the azo compounds such as α,α'-azobisisobutyronitrile, α,α'-azobis-(2-methylbutyronitrile), 1-azobis-(1-cyclohexancarbonitrile) and the like and other free-radical-generating catalysts known to those skilled in the art. Preferably, the catalyst is an azo compound such as α,α'-azobisisobutyronitrile since it is free of the tendency, typically demonstrated by peroxides, of oxidizing mercaptans. The amount of catalyst employed ranges from 0.1 to 1.0 part by weight of catalyst for each part by weight of mercaptan reactant, e.g., from about 40 to about 450 mol percent in the case of α,α'-azobisisobutyronitrile.

Based on the foregoing, it is apparent that the present process, unlike the prior art, involves the reaction of relatively complex mercaptans and requires the presence of an exceedingly large amount of catalyst. For example, whereas as little as 0.1 or 0.2 part by weight of α,α'-azobisisobutyronitrile results in mercaptotetracycline conversion, the yield is relatively low despite relatively high temperature and reaction times when employing refluxing dioxane as the reaction medium and using α-6-deoxy-13-mercapto-5-oxytetracycline sulfosalicylate as starting material. Best results are obtained with refluxing dioxane and this starting material with from about 0.4 to about 0.5 part by weight of α,α'-azobisisobutyronitrile.

Reaction times will vary with the choice and amount of catalyst, temperature and other factors. In general, the longer the reaction time, particularly with higher temperatures, the greater the degree of decomposition of tetracycline reactant and reaction product. As heretofore indicated, the presence of large amounts of free radicals is necessary in order to obtain conversion of the starting material to the desired α-6-deoxytetracycline within a time limit and temperature value consistent with avoiding appreciable decomposition of the starting and final products.

Although the free base 13-mercaptotetracycline starting materials of the present invention as well as the common acid-addition salts thereof may be employed, a preferred starting material is a 13-mercaptotetracycline sulfosalicylate, since the mercaptotetracyclines are so readily prepared and isolated as sulfosalicylates.

The preparation of the 13-mercaptotetracycline starting materials of the present invention is illustrated by U.S. Patent 3,165,531 as well as by working examples appearing hereinafter.

The following examples are for the purpose of illustrating the present invention.

EXAMPLE 1

A mixture of 30 grams of 6-deoxy-6-demethyl-6-methylene-5-oxytetracycline hydrochloride, 105 milliliters methyl alcohol, 105 milliliters water, 135 milliliters thiolacetic acid and 30 grams α,α'-azobisisobutyronitrile is warmed slightly under a nitrogen atmosphere to obtain solution and is then cooled to room temperature. The resulting solution is then exposed to an infrared sun lamp for a period of approximately 3 hours, the temperature thereof increasing up to approximately 70° C. during the course of exposure. Thereafter, the mixture is evaporated to dryness and approximately 450 milliliters of ether is added to the resulting solid and allowed to stir overnight. The product is then filtered and washed with additional ether to obtain 39.73 grams of 6-deoxy-13-(acetylmercapto)-5-oxytetracycline.

EXAMPLE 2

A mixture of 20 grams of the thiolacetic acid adduct of Example 1, 200 milliliters methyl alcohol and 20 milliliters of concentrated hydrochloric acid is heated under reflux with stirring for approximately 2½ hours. It is then treated with Darco G-60 activated carbon and filtered. The filter cake is washed with methanol and the combined filtrate and washings are evaporated to dryness over a steam bath. The resulting yellow product is dissolved in 50 milliliters of methyl alcohol to which are added 30 grams of sulfosalicylic acid. This mixture is then heated while 50 milliliters of water are slowly added. A seed of 6-deoxy-13-(mercapto)-5-oxytetracycline sulfosalicylate is added as the mixture is maintained hot over a steam bath, with resultant rapid crystallization. Following crystallization, the mixture is allowed to cool to room temperature with stirring. After 3 hours, the mixture is again heated on the steam bath and 50 milliliters of additional water are slowly added. Following crystallization overnight at room temperature, the resulting slurry is filtered and washed with a mixture of water and methanol in a ratio of 2:1. The solids are then washed with acetone followed by ether to obtain 10.8 grams of 6-deoxy-13-(mercapto)-5-oxytetracycline sulfosalicylate.

EXAMPLE 3

A mixture of 0.5 gram of the mercaptan product of Example 2, 100 milligrams α,α'-azobisisobutyronitrile and 1.5 milliliters of trimethyl phosphite is stirred at room temperature for about ½ hour. This mixture is then transferred to a three neck flask, 3 milliliters of dioxane is added thereto and the whole is refluxed under nitrogen with agitation by a magnetic stirrer. After approximately 7 minutes of heating under reflux, 25 milligrams of α,α'-azobisisobutyronitrile is added and reflux heating is continued for appproximately 5 minutes. Following the addition of 3 milliliters of water, 0.5 gram of sulfosalicylic acid is added and the mixture is allowed to stand for approximately ½ hour at which time an additional 6 milliliters of water is added. Approximately 40 minutes later, 3 milliliters of additional water is added. Thereafter, the mixture is filtered and the recovered solids are washed with a 10% aqueous solution of dioxane followed by washing with acetone and ether to obtain 0.24 gram of yellow crystalline α-6-deoxy-5-oxytetracylcine sulfosalicylate.

EXAMPLE 4

A mixture of 27 grams of 6-deoxy-13-(mercapto)-5-oxytetracycline sulfosalicylate, 216 milliliters dioxane, 135 milliliters triisopropyl phosphite and 13.5 grams of α,α'-azobisisobutyronitrile is combined and refluxed under nitrogen for approximately 35 minutes. Following this, the mixture is cooled in an ice bath and transferred to a separatory funnel to which is added 250 milliliters of 1.5 N hydrochloric acid and 150 milliliters of ether. After agitation, the aqueous layer is separated, withdrawn and combined with the further aqueous layers obtained on extracting the original ether layer three more times with 50 milliliter quantities of 1.5 N hydrochloric acid. The combined aqueous layers are back-extracted with two 150 milliliter quantities of ether. The resulting aqueous extract is evaporated to a volume of about 150 milliliters and is then transferred to an Erlenmeyer flask together with 25 milliliters of wash water. The resulting solution is warmed to a temperature of approximately 50° C. and 40.5 grams of sulfosalicylic acid is slowly added. After crystallization overnight at room temperature, the precipitated crystalline material is removed by filtration, washed with water, acetone and ether, in that sequence, to obtain 18.1 grams (70% of theoretical) of crystalline α-6-deoxy-5-oxytetracycline sulfosalicylate.

EXAMPLE 5

The procedure of Example 4 is repeated employing 3.0 grams of benzoyl peroxide as catalyst in lieu of α,α'-azobisisobutyronitrile to obtain crystalline α-6-deoxy-5-oxytetracycline sulfosalicylate.

EXAMPLE 6

Substitution of an equivalent amount of 6-deoxy-13-mercapto-tetracycline sulfosalicylate for the sulfosalicylate of Example 3 obtains the corresponding α-6-deoxytetracycline sulfosalicylate.

What is claimed is:

1. A process for producing α-6-deoxytetracyclines which comprises contacting a member selected from the group consisting of 6-deoxy-13-mercapto-5-oxytetracycline, 6-deoxy-13-mercapto-tetracycline and the acid-addition salts thereof with at least an equivalent amount of tri-(lower alkyl) phosphite in the presence of from 0.1 to 1.0 part by weight per part by weight of said selected member, of a free-radical-generating catalyst at a temperature from about 50 to 150° C. until α-6-deoxytetracycline product is obtained and isolating said product from said reaction mixture.

2. The process of claim 1 wherein said member is 6-deoxy-13-mercapto-5-oxytetracycline sulfosalicylate.

3. The process of claim 1 wherein said reaction is carried out in the presence of a reaction-inert organic solvent.

4. The process of claim 1 wherein said reaction is carried out in the presence of dioxane at a temperature from about 100 to 105° C.

5. The process of claim 1 wherein said free-radical-generating catalyst is $\alpha,\alpha'$-azobisisobutyronitrile.

6. The process of claim 1 wherein said reaction is carried out in the presence of dioxane at a temperature of from about 100 to about 105° C. and said free-radical-generating catalyst is $\alpha,\alpha'$-azobisisobutyronitrile.

7. The process of claim 6 wherein said selected member is 6-deoxy-13-mercapto-5-oxytetracycline sulfosalicylate and said product is $\alpha$-6-deoxy-5-oxytetracycline sulfosalicylate.

References Cited

UNITED STATES PATENTS 3,165,531   1/1965   Blackwood et al.

OTHER REFERENCES

Imaev et al.: Chem. Abstracts, vol. 64 (1966), p. 14082 relied on.

Hoffmann et al.: JACS, vol. 78 (1956), p. 6414 relied on.

ALEX MAZEL, Primary Examiner

A. M. T. TIGHE, Assistant Examiner